(12) United States Patent
Qu et al.

(10) Patent No.: US 9,246,208 B2
(45) Date of Patent: Jan. 26, 2016

(54) ELECTROTEXTILE RFID ANTENNA

(71) Applicant: HAND HELD PRODUCTS, INC., Fort Mill, SC (US)

(72) Inventors: Huyu Qu, San Jose, CA (US); Fouad Nusseibeh, Champlin, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 13/960,366

(22) Filed: Aug. 6, 2013

(65) Prior Publication Data
US 2015/0041540 A1 Feb. 12, 2015

(51) Int. Cl.
*H01Q 1/22* (2006.01)
*H01Q 1/27* (2006.01)
*H01Q 1/38* (2006.01)

(52) U.S. Cl.
CPC ............ *H01Q 1/2225* (2013.01); *H01Q 1/273* (2013.01); *H01Q 1/38* (2013.01)

(58) Field of Classification Search
CPC ........ H01Q 1/2225; H01Q 1/273; H01Q 1/38
See application file for complete search history.

(56) References Cited

U.S. PATENT DOCUMENTS

| | | | | |
|---|---|---|---|---|
| 5,182,569 A * | 1/1993 | Bui-Hai | ................. | H01Q 19/19 343/781 CA |
| 5,572,226 A * | 11/1996 | Tuttle | ............................ | 343/726 |
| 6,147,605 A * | 11/2000 | Vega et al. | .................. | 340/572.7 |
| 6,265,977 B1 * | 7/2001 | Vega et al. | .................. | 340/572.7 |
| 6,377,216 B1 * | 4/2002 | Cheadle | ............... | H01Q 9/0407 343/700 MS |
| 6,433,743 B1 * | 8/2002 | Massey et al. | ......... | 343/700 MS |
| 6,972,725 B1 * | 12/2005 | Adams | .......................... | 343/718 |
| 7,126,553 B1 * | 10/2006 | Fink et al. | ..................... | 343/767 |
| 7,198,174 B2 * | 4/2007 | Sloan | ............................... | 221/33 |
| 7,830,319 B2 * | 11/2010 | Cohen | .................... | H01Q 1/273 343/700 MS |
| 8,547,286 B2 * | 10/2013 | Xu et al. | ........................ | 343/753 |
| 8,596,533 B2 * | 12/2013 | Qu | ................... | G06K 19/07749 235/440 |
| 8,757,495 B2 * | 6/2014 | Qu | ..................... | G06K 7/10475 235/454 |
| 8,773,320 B2 * | 7/2014 | Park | ....................... | H01Q 13/28 343/722 |
| 8,779,898 B2 * | 7/2014 | Havens | .............. | G06K 7/10386 235/426 |
| 8,928,530 B2 * | 1/2015 | Achour | ................ | H01Q 5/0024 343/700 MS |
| 2002/0089458 A1 * | 7/2002 | Allen | .................... | H01Q 9/0421 343/718 |
| 2003/0098812 A1 * | 5/2003 | Ying et al. | ..................... | 343/702 |
| 2003/0160732 A1 * | 8/2003 | Van Heerden | ........ | G06K 19/027 343/897 |
| 2005/0062669 A1 * | 3/2005 | Aisenbrey | ................ | H01Q 9/28 343/795 |
| 2005/0235482 A1 * | 10/2005 | Deaett et al. | .................... | 29/600 |
| 2005/0248487 A1 * | 11/2005 | Okado | ................... | 343/700 MS |
| 2006/0187056 A1 * | 8/2006 | Carmi et al. | ............... | 340/572.7 |
| 2006/0290512 A1 * | 12/2006 | Shanton | ........... | G06K 19/07752 340/572.7 |

(Continued)

OTHER PUBLICATIONS http://www.shieldextrading.net/pdfs/Nora.pdf 2010 Technical Data Sheet (Nora). Shieldex Trading USA.*

(Continued)

*Primary Examiner* — Daniel Walsh
(74) *Attorney, Agent, or Firm* — Oliff PLC; R. Brain Drozd

(57) ABSTRACT

A system for reading transponders may include a printed circuit board and an electrotextile antenna. The printed circuit board may include an RFID reading circuit, and the electrotextile antenna may be electrically connected to the printed circuit board via a connection. The electrotextile antenna may be composed of a material made by blending or coating textiles with a metal, and the electrotextile antenna may be configured to transmit and receive signals between the RFID reading circuit and RFID tags.

19 Claims, 10 Drawing Sheets

(56) References Cited

U.S. PATENT DOCUMENTS

| | | | | |
|---|---|---|---|---|
| 2007/0159400 | A1* | 7/2007 | DeJean | H01Q 1/243 343/700 MS |
| 2007/0210973 | A1* | 9/2007 | Tanaka | H01Q 1/085 343/720 |
| 2008/0048917 | A1* | 2/2008 | Achour | H01Q 1/38 343/700 MS |
| 2009/0165296 | A1* | 7/2009 | Carmi | H01P 11/003 29/847 |
| 2010/0123635 | A1* | 5/2010 | Lopez | H01Q 1/38 343/722 |
| 2010/0188306 | A1* | 7/2010 | Kitayoshi et al. | 343/767 |
| 2010/0225554 | A1* | 9/2010 | Huang | H01Q 15/0086 343/821 |
| 2010/0231464 | A1* | 9/2010 | Huang | H01Q 1/38 343/702 |
| 2011/0227795 | A1* | 9/2011 | Lopez | H01Q 1/243 343/700 MS |
| 2011/0273353 | A1* | 11/2011 | Achour | H01Q 5/0024 343/850 |
| 2012/0206242 | A1* | 8/2012 | Cho | 340/10.42 |
| 2012/0223142 | A1* | 9/2012 | Wang | H01Q 1/2216 235/462.25 |
| 2013/0043309 | A1* | 2/2013 | Qu | G06K 19/07749 235/440 |
| 2013/0043981 | A1* | 2/2013 | Wang et al. | 340/10.1 |
| 2013/0049962 | A1* | 2/2013 | Smith et al. | 340/572.1 |
| 2013/0088304 | A1* | 4/2013 | Henderson | H01P 3/081 333/33 |
| 2014/0008437 | A1* | 1/2014 | Wang et al. | 235/439 |
| 2014/0154808 | A1* | 6/2014 | Patel | G01K 3/04 436/1 |
| 2014/0209690 | A1* | 7/2014 | Teng | G06K 19/027 235/492 |
| 2014/0217175 | A1* | 8/2014 | Fogg et al. | 235/439 |
| 2014/0291409 | A1* | 10/2014 | Nitta | H01Q 1/38 235/492 |
| 2015/0029064 | A1* | 1/2015 | Pan | H01Q 1/22 343/720 |
| 2015/0041540 | A1* | 2/2015 | Qu | H01Q 1/2225 235/439 |
| 2015/0235122 | A1* | 8/2015 | Finn | G06K 19/07794 235/439 |

OTHER PUBLICATIONS http://www.shieldextrading.net/pdfs/NoraDell%20CR.pdf 2010 Technical Data Sheet (Nora Dell-CR). Shieldex Trading USA.* http://www.shieldextrading.net/pdfs2014/1400201130LX%20Nora%20LX.pdf 2010 Technical Data Sheet (Nor-LX). Shieldex Trading USA.*

* cited by examiner

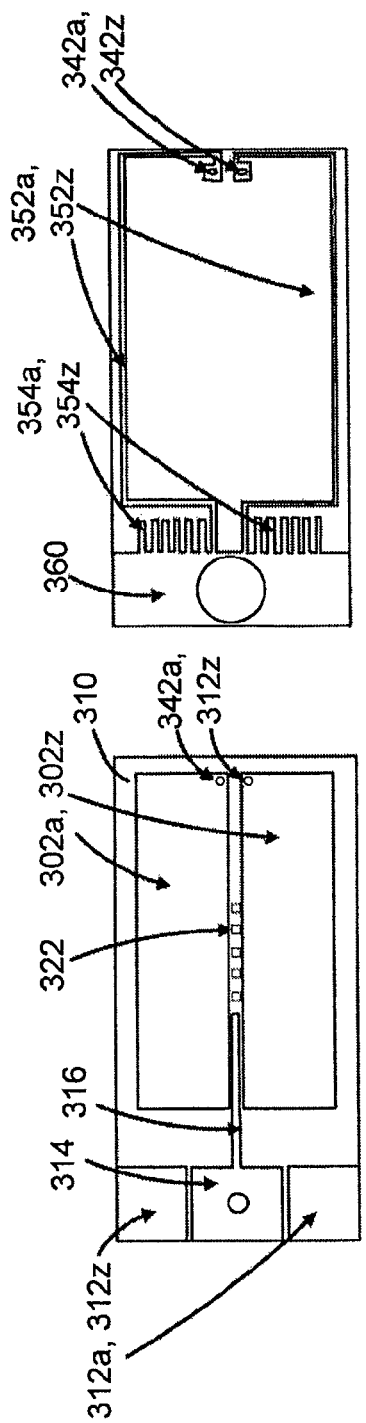
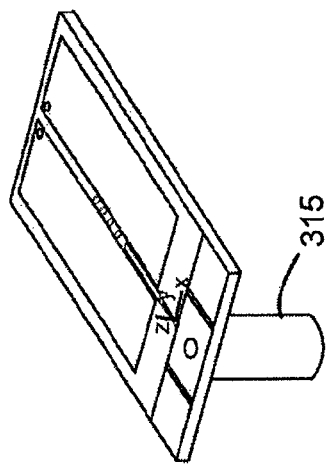
FIG. 5a
FIG. 5b
FIG. 5c

ELECTROTEXTILE RFID ANTENNA

FIELD OF THE INVENTION

The invention is generally related to radio frequency identifier (RFID) devices and is specifically related to RFID antennas using electrotextile materials.

BACKGROUND OF THE INVENTION

RFID antennas are widely used in a number of applications, including smart cards, item tracking in manufacturing and retail, etc. RFID antennas may have a relatively narrow bandwidth. As such, RFID antennas are susceptible to the operating environment. With the effects of an operators hand or body, antenna resonant frequency may wholly shift off the target frequency band. As such, current RFID antennas may have a relatively narrow bandwidth and as such, may not be wholly reliable.

SUMMARY OF THE INVENTION

There is provided herein a RFID reader having an antenna composed of electrotextile materials. The electrotextile materials may be textiles blended with or coated with some sort of metal (e.g., copper, nickel, and/or silver). The electrotextile RFID antenna has a broad bandwidth and higher return loss without compromising antenna gain as compared with conventional antennas. Additionally, the electrotextile RFID antenna is flexible and as such may be used in compact designs. In one embodiment, the electrotextile materials may be used for a metamaterial (MTM) antenna design.

In one aspect, a system for reading transponders may include a printed circuit board and an electrotextile antenna. The printed circuit board may include an RFID reading circuit, and the electrotextile antenna may be electrically connected to the printed circuit board via a connection. The electrotextile antenna may be composed of a material made by blending or coating textiles with a metal, and the electrotextile antenna may be configured to transmit and receive signals between the RFID reading circuit and RFID tags.

In another aspect, an apparatus may include a substrate, a printed circuit board, and an electrotextile antenna attached to the substrate and electrically connected to the printed circuit board via a connection. The electrotextile antenna may be composed of a material made by blending or coating textiles with a metal, wherein the electrotextile antenna is configured to send and receive communication from radio frequency identification (RFID) transponders. The electrotextile antenna may include one or more spatially separated conductive cell patches, a feed pad, and one or more conductive feed lines connected to the feed pad.

In yet another aspect, a method of manufacture of an electrotextile RFID antenna may include providing a textile material and blending or coating portions of the textile material with a metal, resulting in electrotextile material. A structure is formed with the electrotextile material, and such structure forms an electrotextile antenna so as to transmit and receive signals from RFID transponders. A portion of the electrotextile antenna is electrically connected to a printed circuit board, where the printed circuit board may include an RFID circuit so that the electrotextile antenna transmits interrogation signals generated by the RFID circuit to the RFID transponders and receives response signals from the RFID transponders.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4b illustrates a perspective view of the multiple cell metamaterial (MTM) antenna of FIG. 4a;

FIG. 5a illustrates a top view of another embodiment of a multiple cell metamaterial (MTM) antenna;

FIG. 5b illustrates a bottom view of the multiple cell metamaterial (MTM) antenna of FIG. 5a;

FIG. 5c illustrates a perspective view of the multiple cell metamaterial (MTM) antenna of FIG. 5a;

FIG. 6b illustrates a side view of the multiple cell metamaterial (MTM) antenna of FIG. 6a;

FIG. 7b illustrates a side view of the multiple cell metamaterial (MTM) antenna of FIG. 7a;

FIG. 8b illustrates a perspective view of the multiple cell metamaterial (MTM) antenna of FIG. 8a;

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided a reader, such as an encoded information reading (EIR) terminal, comprising a radio frequency identifier (RFID) reading device. The RFID reader can be configured to read RFID tags containing encoded messages. In one embodiment, the RFID reader can be configured to read a RFID tag containing an encoded message and output raw message data containing the encoded message. In another embodiment, the RFID reader can be configured to read a RFID tag containing an encoded message and output decoded message data corresponding to the encoded message.

Various embodiments of the RFID reader can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing a RFID tag in the card. Item tracking can be implemented by placing a RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

Figure 1A:
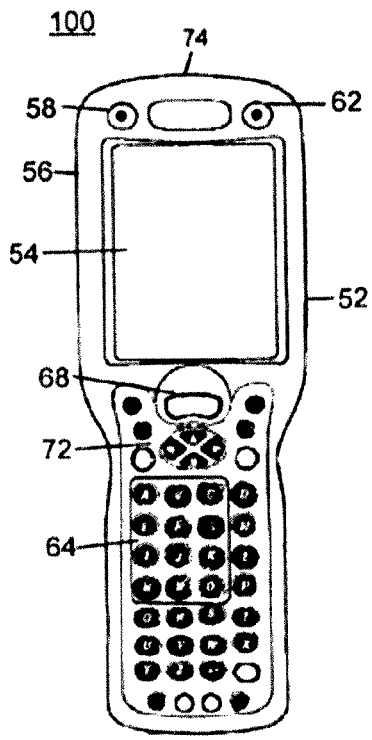
FIGS. 1A, 1B, and 1C schematically illustrate views of one embodiment of a RFID reader.

One embodiment of RFID reader 100 is shown in FIGS. 1A (front panel view), 1B (side panel view), and 1C (bottom panel view). RFID reader 100 can comprise housing 52 within which other components of RFID reader 100 can be disposed. LCD screen display with touch screen sensor 54 can be disposed on the front panel 56. Also disposed on front panel 56 can be decode LED 58, scan LED 62, and keyboard 64 including scan key 68 and navigation keys 72. Imaging window 74 can be disposed on the top panel of housing 52. Disposed on the side panel (best viewed in FIG. 1B) can be infrared communication port 76, access door to a secure digital (SD) memory interface 78, audio jack 80, and hand strap 82. Disposed on the bottom panel (best viewed in FIG. 1C) can be multi-pin mechanical connector 84 and hand strap clip 86.

Figure 1B:
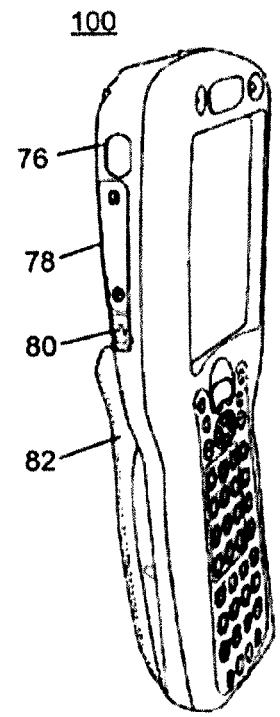
Figure 1C:
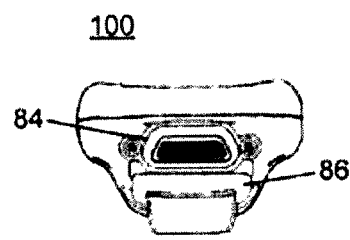

While FIGS. 1A-1C illustrate a hand held housing, a skilled artisan would appreciate the fact that other types and form factors of terminal housings are within the scope of this disclosure.

Figure 2:
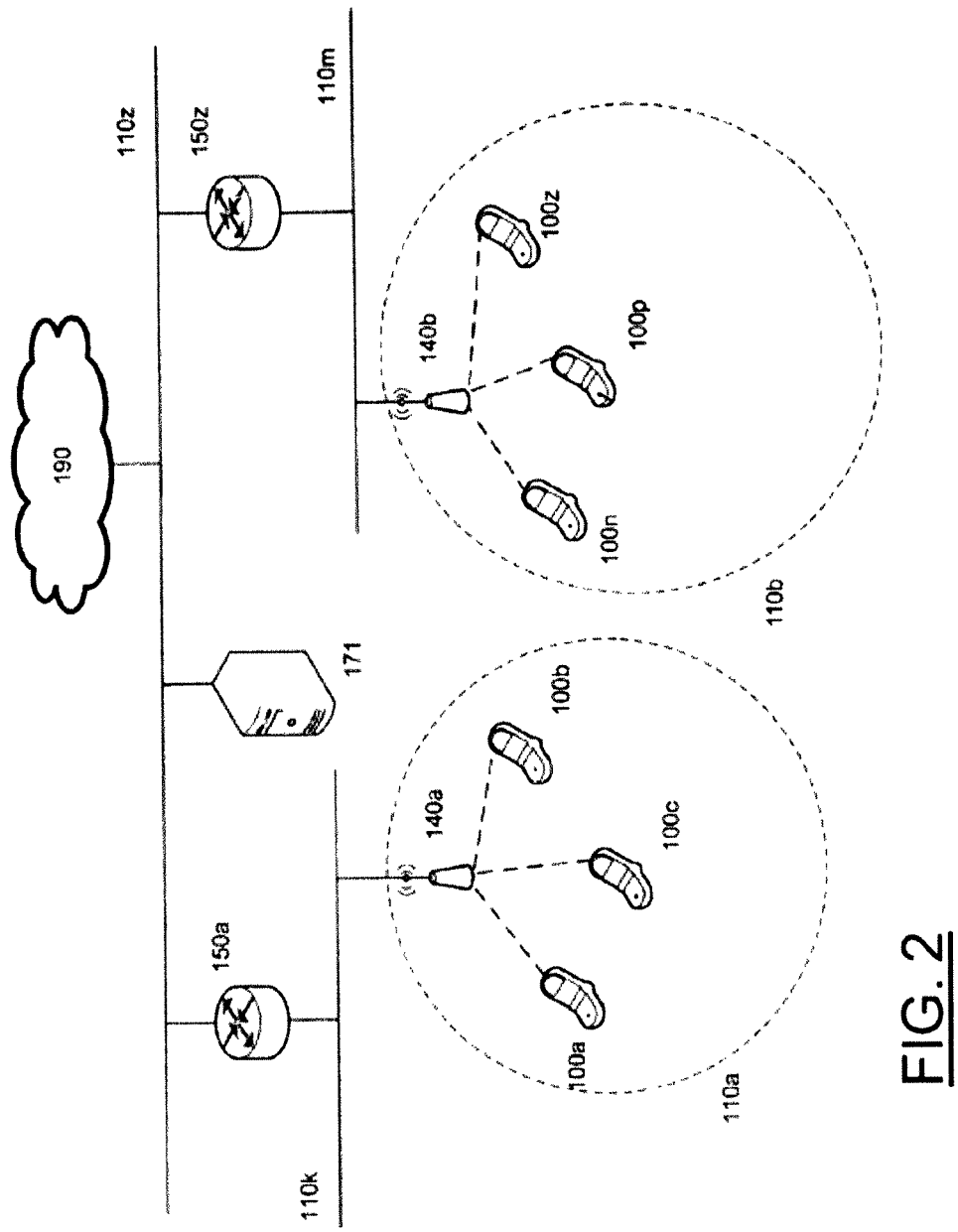
FIG. 2 depicts a network-level layout of a data collection system utilizing RFID readers according to one embodiment.

In a further aspect, the RFID reader can be incorporated in a data collection system. The data collection system, schematically shown in FIG. 2, can include a plurality of RFID readers 100a-100z in communication with a plurality of interconnected networks 110a-110z. In one aspect, the plurality of networks 110a-110z can include at least one wireless communication network. In a further aspect, a RFID reader can comprise a communication interface which can be used by the terminal to connect to one or more networks 110a-110z. In one embodiment, the communication interface can be provided by a wireless communication interface.

The RFID reader 100c can establish a communication session with the host computer 171. In one embodiment, network frames can be exchanged by the RFID reader 100c and the host computer 171 via one or more routers, base stations, and other infrastructure elements. In another embodiment, the host computer 171 can be reachable by the RFID reader 100c via a local area network (LAN). In a yet another embodiment, the host computer 171 can be reachable by the RFID reader 100c via a wide area network (WAN). A skilled artisan would appreciate the fact that other methods of providing interconnectivity between the RFID reader 100c and the host computer 171 relying upon LANs, WANs, virtual private networks (VPNs), and/or other types of network are within the scope of this disclosure.

In one embodiment, the communications between the RFID reader 100c and the host computer 171 can comprise a series of HTTP requests and responses transmitted over one or more TCP connections. In one embodiment, the communications between the RFID reader 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the RFID reader can include decoded message data corresponding to, e.g., a bar code label or a RFID label attached to a product or to a shipment item. For example, a RFID reader can transmit a request to the host computer to retrieve product information corresponding to a product identifier encoded by a bar code label attached to the product, or to transmit an item tacking record for an item identified by a bar code label attached to the product.

Component-level diagram of one embodiment of a RFID reader is now being described with reference to FIG. 3. RFID reader 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reader 100 can comprise a single microprocessor which can be referred to as a central processing unit (CPU). In another embodiment, RFID reader 100 can comprise two or more microprocessors, for example, a CPU providing some or most of the RFID reader functionality and a specialized microprocessor performing some specific functionality. A skilled artisan would appreciate the fact that other schemes of processing tasks distribution among two or more microprocessors are within the scope of this disclosure.

RFID reader 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol LTE protocol and/or at least one protocol of the CDMA/1× EV-DO protocol family.

RFID reader 100 can further comprise a keyboard interface 354 and a display adapter 355, both also coupled to the system bus 370. RFID reader 100 can further comprise a battery 356. In one embodiment, the battery 356 can be provided by a replaceable rechargeable battery pack.

RFID reader 100 can further comprise a GPS receiver 380. RFID reader 100 can further comprise at least one connector 390 configured to receive a subscriber identity module (SIM) card.

RFID reader 100 can further comprise one or more reading devices 330, provided, for example, but not limited to, by a RFID reading device, a bar code reading device, or a card reading device. In one embodiment, the RFID terminal can be configured to read an encoded message using reading device 330, and to output raw message data containing the encoded message. In another embodiment, the RFID terminal can be configured to read an encoded message using reading device 330, and to output decoded message data corresponding to the encoded message. As used herein, "message" is intended to denote a character string comprising alphanumeric and/or non-alphanumeric characters according to one embodiment. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, RFID reader 100 can further comprise a RFID reading device 333. RFID reader 100 can be configured to read RFID tags containing decoded messages. In one embodiment, the RFID terminal can be configured to read, using RFID reading device 333, a RFID tag containing an encoded message, and to output raw message data containing the encoded message. In another embodiment, the RFID terminal can be configured to read, using RFID reading device 333, a RFID tag containing an encoded message, and to output decoded message data corresponding to the encoded message.

In a further aspect, the RFID reading device can comprise an antenna 338. In one embodiment, the antenna 338 of FIG. 3 can be provided by a metamaterial (MTM) antenna and/or an electrotextile antenna, which are each discussed below in respective headings.

Metameterial Antennas

Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, β), where E is the electrical field, H is the magnetic field, and β is the phase velocity) exhibiting a positive refractive index, a metamaterial due to its artificial structure can exhibit a negative refractive index and follow the left-hand rule for the trio (E, H, β). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

MTM antennas have a relatively narrow bandwidth. For CRLH materials, the left-hand resonant frequency bands are narrower than the same order right-hand resonant frequency bands. Because of such narrow bandwidth, MTM antennas may be susceptible to environments. A small factor may shift the band off targeted frequency, and greatly downgrade the performance. To correct such issue, various antennas may be designed to lower the return loss and thus, increase the bandwidth, such as the antennas discussed below in FIGS. 4-9.

Figure 3:
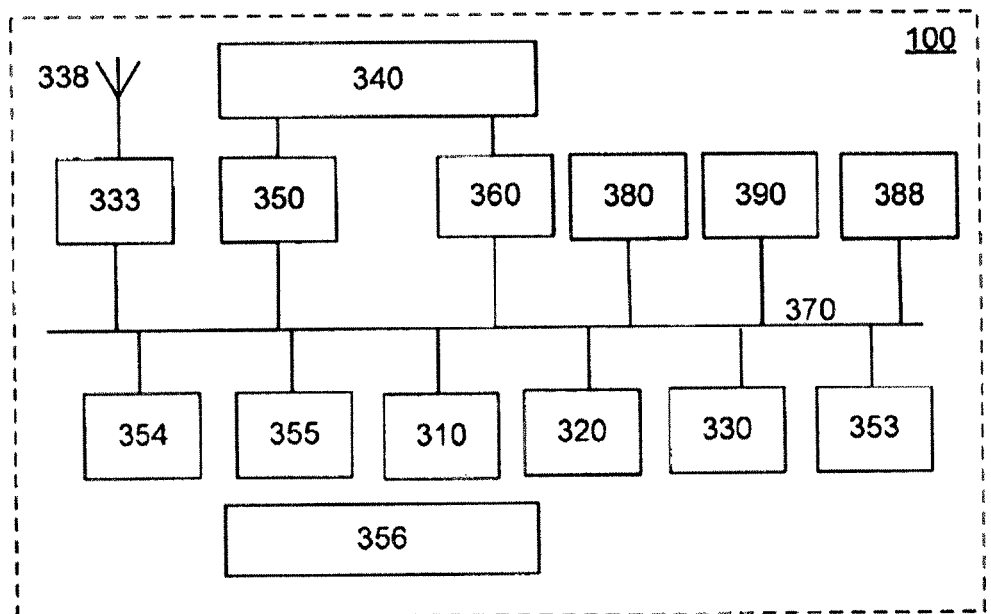
FIG. 3 depicts component-level layout of a RFID reader according to one embodiment.
Figure 4A:
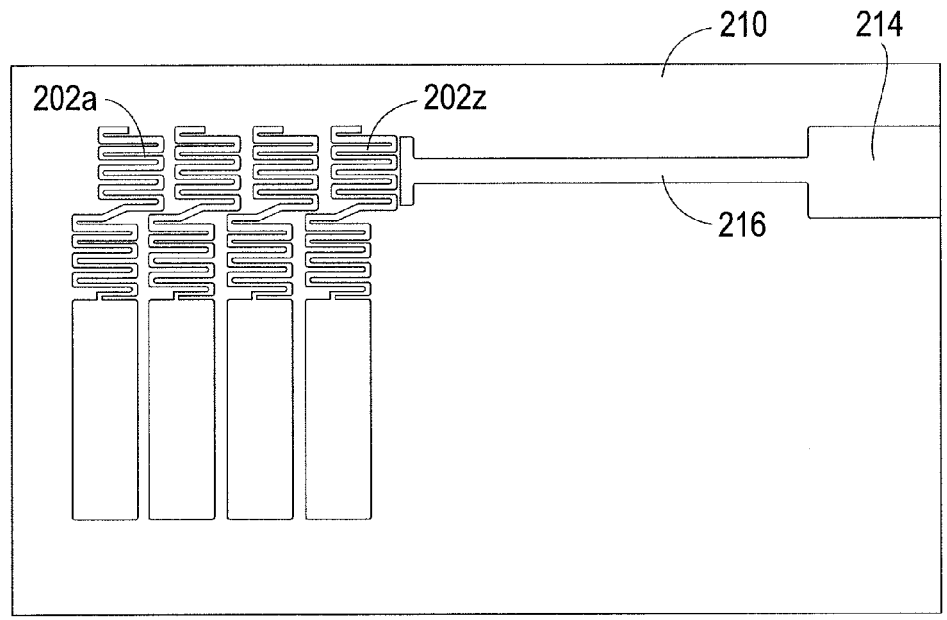
FIG. 4a illustrates a top view of one embodiment of a multiple cell metamaterial (MTM) antenna.
Figure 4B:
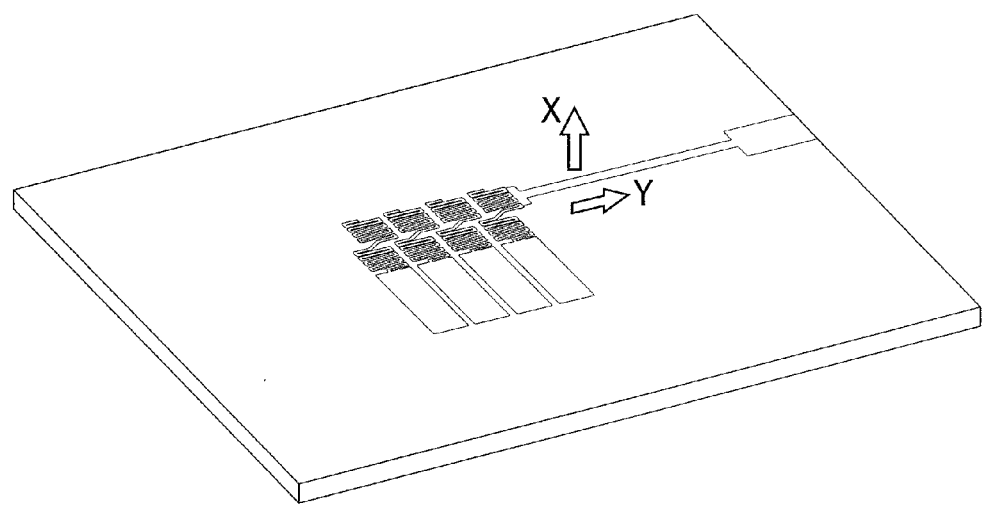

In one embodiment, antenna 338 of FIG. 3 can be provided by a multiple cell MTM antenna shown in FIGS. 4 a (top view) and 4 b (3D view). Antenna 338 can comprise one or more conductive cell patches 202 a-202 z that can be mounted on a dielectric substrate, provided, for example, by a printed circuit board (PCB) 210. Conductive cell patches 202 a-202 z can be spatially separated so that capacitive couplings between adjacent cell patches can be created. Also disposed on the dielectric substrate 210 can a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202 a-202 b. A skilled artisan would appreciate the fact that MTM antennas having two or more conductive feed lines are within the scope of this disclosure. A ground plane can be provided by a metallic layer disposed on the bottom side of PCB 210 (not shown in FIG. 4 a). Each cell patch can be connected to the ground plane by a via In one embodiment, antenna 338 of FIG. 3 can be provided by a multiple cell MTM antenna shown in FIGS. 5 a (top view), 5 b (bottom view), and 5 c (3D view). Antenna 338 can comprise one or more conductive cell patches 302a-302z that can be mounted on a dielectric substrate, provided, for example, by a printed circuit board (PCB) 310. Conductive cell patches 302 a-302 z can be spatially separated so that capacitive couplings between adjacent cell patches can be created. Also disposed on the top surface of dielectric substrate 310 can be a feed pad 314 that can be provided, e.g., by a metallic plate and can be connected to a conductive feed line 316. Conductive feed line 316 can be provided, e.g., by a metallic strip, and can be located close but separately from conductive cell patches 302 a-302 z. A skilled artisan would appreciate the fact that MTM antennas having one or more conductive feed lines are within the scope of this disclosure. At least one conductive feed line can comprise a feed line tuner 322 provided by a conductive strip having a curved line form or an open polygon line form. A feed line tuner can be used to adjust resonant frequency of antenna 338 as explained herein infra.

In one embodiment, feed pad 314 can be electrically coupled to coaxial cable connector 315. In one embodiment, shown in FIG. 5c, coaxial cable connector 315 can be connected from the bottom side of antenna 338. In another embodiment, coaxial cable connector 3 1 5 can be connected from a lateral side of antenna 3 3 8. In a yet another embodiment, feed pad 314 can be electrically coupled to a twisted cable.

Also disposed on the top surface of dielectric substrate 310 can be one or more ground planes 312 a-312 z provided, e.g., by one or more metallic plates.

One or more conductive cell patches 302 a-302 z can be connected by one or more vias 342 a-342 z to one or more conductive via lines 352 a-352 z disposed on the bottom surface of dielectric substrate 310. At least one conductive via line 352 a-352 z can comprise a via line tuner 354 a-354 z provided by a conductive strip having a curved line form or an open polygon line form. A via line tuner can be used to adjust resonant frequency of antenna 338 as explained herein infra. Also disposed on the bottom surface of dielectric substrate 310 can be a bottom ground plane 360.

Figure 6A:
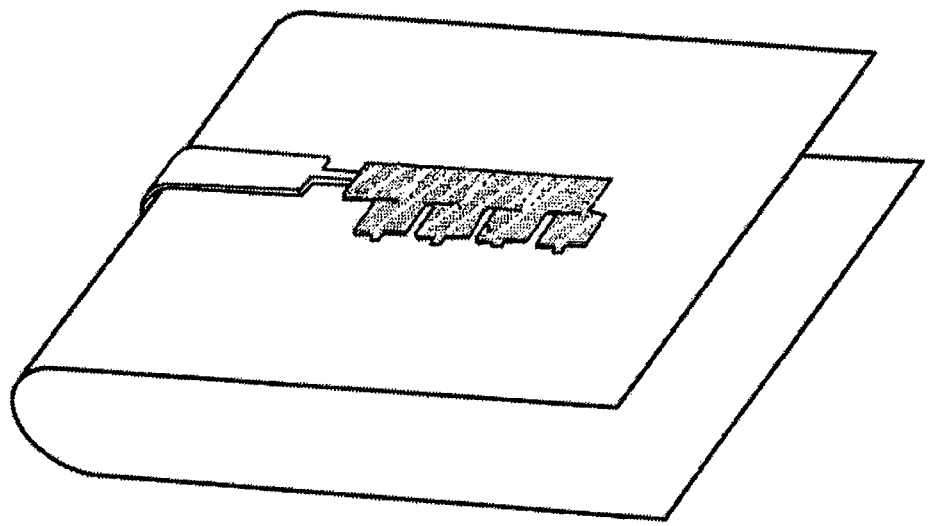
FIG. 6a illustrates a perspective view of another embodiment of a multiple cell metamaterial (MTM) antenna.
Figure 6B:

In one embodiment, dielectric substrate 310 can have a folded plane form-factor, as shown in FIGS. 6a (3D view) and 6b (side view). The gap between the two ends of the folded plane can be unfilled (air gap) or can be filled with a dielectric material. The folded design can advantageously offer extra air gap (or can be filled with other material). In another aspect, due to the folded design, a multi-layer MTM design can be implemented without inter-connections.

Figure 7B:
Figure 7A:
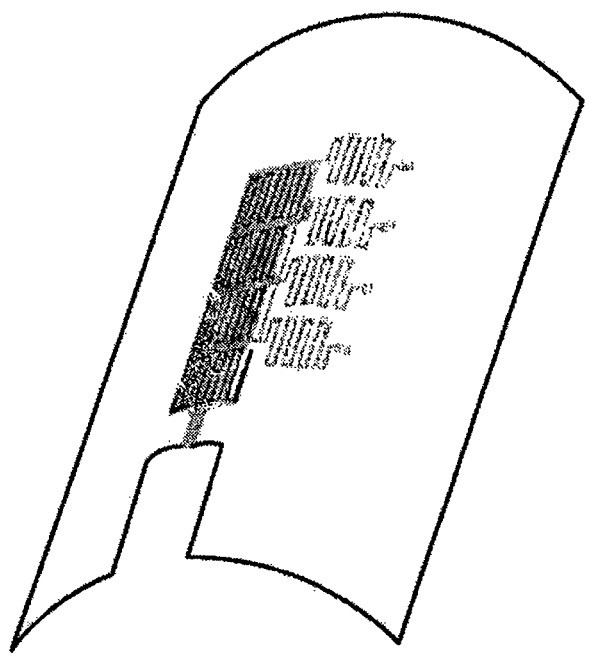
FIG. 7a illustrates a perspective view of another embodiment of a multiple cell metamaterial (MTM) antenna.

In one embodiment, dielectric substrate 310 can have a curved plane form-factor, as shown in FIGS. 7a (3D view) and 7b (side view). The gap between the two ends of the folded plane can be unfilled (air gap) or can be filled with a dielectric material. A skilled artisan would appreciate the fact that MTM antennas mounted on dielectric substrates having a more complex form factors (e.g., a 3D surface) are within the scope of this disclosure. A curved surface can advantageously provide additional tune to the antenna directivity. A more complicated 3D surface can be constructed by folding and wrapping on object having a desired shape, such as a cone.

Figure 8A:
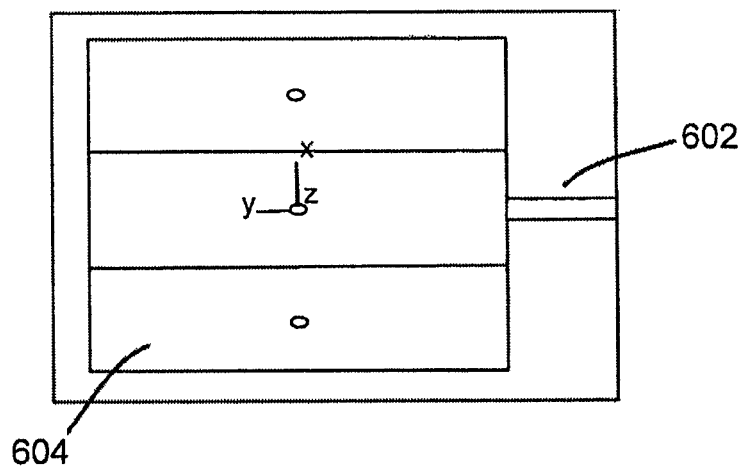
FIG. 8a illustrates a top view of another embodiment of a multiple cell metamaterial (MTM) antenna.
Figure 8B:
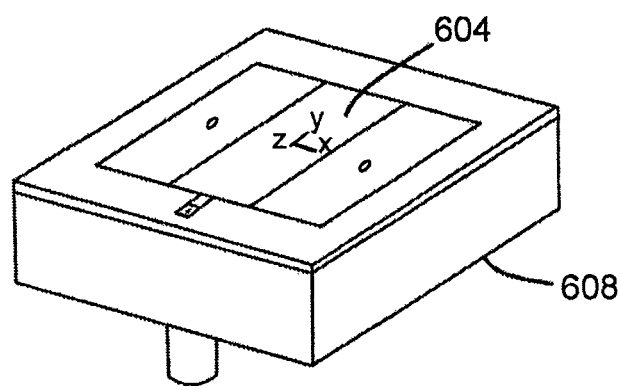

In one embodiment, antenna 338 of FIG. 1 can be provided by a mushroom-shape MTM antenna shown in FIGS. 8a (top view) and 8b (3D view). In one embodiment, the gap between the feed line 602 and the top patch 604 can form a capacitor (left-hand); the via between the top patch 604 and the bottom ground 608 can form an inductance (left-hand).

In a further aspect, antenna 338 of FIG. 1 can be broadband, ultrawideband (UWB), or multiband (MB). Antenna 338 of FIG. 1 can be designed to support the desired functionality and characteristics. Antenna size, resonant frequencies, bandwidth, and matching properties can be controlled by changing the antenna design parameters including number and size of cells, the gap between the cells, the gap between the feed line and the cells, the size (radius and height) and location of vias, the length and width of the feed line, the length and width of the via line, the material and thickness of the substrate, and various other dimensions and layouts.

Antenna size and resonant frequency can be controlled by the patch shape and size. Cell patches can have a rectangular, triangular, circular or other shape. The most efficient antenna area usage can be provided by a rectangular shape. In a further aspect, the resonant frequency can be sensitive to the via line length. To control the via line length, a via line tuner can be provided having a straight line form, a curved line form, or an open polygon line form. The via line length can be used to adjust resonant frequency due to its left hand inductive character. In a further aspect, the resonant frequency can be sensitive to the feed line length and the size of the gap between a feed line and a cell patch. To control the feed line length, a feed line tuner can be provided having a straight line form, a curved line form, or an open polygon line form. The feed line length can be used to adjust resonant frequency due to its left hand capacitive character. In a further aspect, the resonant frequency can be sensitive to the thickness of the substrate on which the antenna components are disposed. The substrate thickness can range from 0.1 mm to 150 mm depending upon the substrate material. Various materials having different permittivity can be used, for example, but not limited to, FR4 ($\in r$=4.4), Getek ($\in r$=4.0), Polyimide ($\in r$=3.5), Polyester ($\in r$=3.9), Arlon AD250 ($\in r$=2.5), RT/duroid 5880 ($\in r$=2.2), etc.

In another aspect, an antenna can comprise a single cell or multiple cells. A multi-cell antenna can have a smaller resonant frequency shift as compared to a single cell antenna, but also can have a higher peak gain due to a better beam concentration.

In another aspect, the antenna return loss can be controlled by the radius of one or more vias that connect the cell patches and the ground plane: vias having smaller radius can provide a better return loss.

In one embodiment, the communication interface 340 and RFID reading device can share one MTM antenna 338.

In a further aspect, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, RFID reader 100 can transmit information to a passive RFID tag by modulating an RF signal in the 860-960 MHz frequency range. An RFID tag can receive both information and operating energy from the RF signal transmitted by RFID reader 100. RFID reader 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reader 100. In one embodiment, the RFID tag can modulate the reflection coefficient of its antenna only responsive to receiving an RFID signal from RFID reader 100.

In a further aspect, RFID reader 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

RFID reader 100 can be configured to receive information from a RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FMO baseband or Miller modulation of a subcarrier at the data rate. The encoding method to be employed by a RFID tag can be selected by RFID reader 100.

In another aspect, the communication link between RFID reader 100 and a RFID tag can be half-duplex, meaning that the RFID tag is not required to demodulate RFID reader's commands while backscattering. A half-duplex system means communication in both directions, but only one direction at a time (not simultaneously). Typically, once a party begins receiving a signal, it must wait for the transmitter to stop transmitting, before replying.

In another aspect, RFID reader can establish one or more sessions with one or more RFID tags. An RFID tag can support at least one session-dependent flag for every session. The session-dependent flag can have two states. An RFID tag can invert a session-dependent flag responsive to receiving a command from RFID reader 100. Tag resources other than session-dependent flags can be shared among sessions. In another aspect, an RFID tag can support a selected status flag indicating that the tag was selected by RFID reader 100.

Responsive to receiving an interrogation signal transmitted by RFID reader 100, an RFID tag can transmit a response signal back to RFID reader 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, RFID reader can implement EPC™ Class-1 Generation-2 UHF RFID Protocol for Communications at 860 MHz-960 MHz by EPCglobal. RFID reader 100 can interrogate RFID tags using the commands described herein infra.

Select command can be used by RFID reader 100 to select a particular RFID tag population for the subsequent inventory round. Select command can be applied successively to select a particular tag population based on user-specified criteria. Select command can include the following parameters:

Target parameter indicates whether Select command modifies a tag's SL flag or
Inventoried flag, and in the latter case it further specifies one of four available sessions (S0, . . . , S3);
Action parameter indicates whether matching tags assert or de-assert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by RFID reader 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response; and/or

NAK command can be used to force a tag to change its state to Arbitrate.

An RFID tag can implement a state machine. Once energized, a tag can change its current state to Ready. A selected tag can, responsive to receiving Query command, select a random integer from the range of [0; 2Q−1]. If the value of zero is selected, the tag can transition to Reply state, back-scattering a 16-bit random number. If a non-zero value is selected, the tag can load the selected random integer into its slot counter and change its state to Arbitrate.

Responsive to receiving the tag transmission, RFID reader can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of [0; 2Q−1], load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, RFID reader can send a QueryAdjust command causing the tag to invert its Inventoried flag and to transition to Ready state.

Access command set can be used by RFID reader 100 for communicating with (reading from and writing to) a tag. An individual tag must be uniquely identified prior to access. Access command set includes the following commands:

ReqRn command can be used by RFID reader 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by RFID reader 100 to read tag's Reserved, EPC, TID and User memory;

Write command can be used by RFID reader 100 to write to tag's Reserved, EPC, TID and User memory;

Kill command can be used by RFID reader 100 to permanently disable a tag;

Lock command can be used by RFID reader 100 to lock passwords preventing subsequent read or write operations; lock individual memory banks preventing subsequent write operations; permanently lock the lock status of passwords or memory banks;

Access command can be used by RFID reader 100 to cause a tag having a non-zero access password to transition from Open to Secured state.

A skilled artisan would appreciate the fact that other methods of interrogating RFID tags by RFID reader 100 are within the scope of this disclosure.

Electrotexile Antennas

The above-described antennas (as well as conventional antennas) are typically "hard" and do not have much physical flexibility. For example, a patch design antenna may comprise hard metal elements, in the form of conductive plates placed around a dielectric slab. However, these metal elements may prevent the potential deformation of the antenna. Indeed, these metal elements may make the antenna extremely rigid, preventing use in a component in a flexible system structure. Furthermore, these antenna elements may have set narrow bandwidths at certain specific ranges.

Textiles may be employed for providing electronic functionalities of an antenna. Electrotextiles provide the features of flexibility, structure, large area capability, and a broad bandwidth, especially relative to wireless frequency ranges (e.g., 900 MHz or 2.45 GHz). According to some embodiments, electrotextiles are textiles with electrical properties, which are made by blending or coating textiles with copper fibers, nickel fibers, silver fibers, and/or any other conductive material. Electrotextiles may have many textures, weaves and combination of materials. Electrotextiles may be used for electromagnetic shielding, anti-static and heating purposes, and also for soft circuits: electric circuits or sensors made out of a combination of special fabrics, threads, yarns and electronic components.

Provided herein, in one embodiment, is an electrotextile antenna structure that has an increased bandwidth and high efficiency at high frequencies, and especially in the frequency range of wireless communication (e.g., 900 MHz or 2.45 GHz). Electrotextile materials have more losses and thus, electrotextile antennas are lossier. In this regard, electrotextiles improves the return loss of an antenna as compared with conventional antennas. Using electrotextile materials as the conductive radiating portions of an antenna increases the bandwidth of the antenna. Another advantage of an electrotextile antenna is that the antenna can be bent or otherwise deformed in some other manner in an RFID reader or other apparatus. This allows an antenna to be inserted into a compact device, such as the antenna in a compact RFID reader.

In one embodiment, as mentioned above, the electrotextile materials can be used as one or more conductive components of each of the antenna designs of FIGS. 4-9. For example, the antenna elements 202, conductive feed line 216, and/or feed pad 214 of FIG. 4a may be electrotextile materials instead of a rigid metal material. Thus, electrotextile materials may be used as the material for MTM antennas.

It should be noted that when using electrotextiles in MTM antennas, several advantages and differences result. For example, in the above-discussed MTM antennas, glass-reinforced epoxy laminate printed circuit boards (e.g., FR4 grade PCB) may be used as a substrate as well as copper as the conductive patch and ground. These MTM antennas may have a relatively narrow bandwidth. Electrotextile materials may be used in place of the radiating elements of the antenna (e.g., in place of the copper portion used as the conductive patch and ground). Additionally, electrotextile materials no longer need to be connected to and integrated into a printed circuit board (e.g., FR4). Instead, the electrotextile materials may simply be connected to a substrate that is used primarily (or solely) to physically support the shape of the electrotextile materials. For example, a felt fabric substrate (e.g., a substrate made primarily of felt fabric and having a relative permittivity of less than 2 (e.g., 1.22)) may be used as the foundation where the electrotextile antenna is connected to. In this configuration, using electrotextile materials in place of the conductive materials in the antenna improve the return loss and extend the bandwidth of the antenna.

Figure 9A:
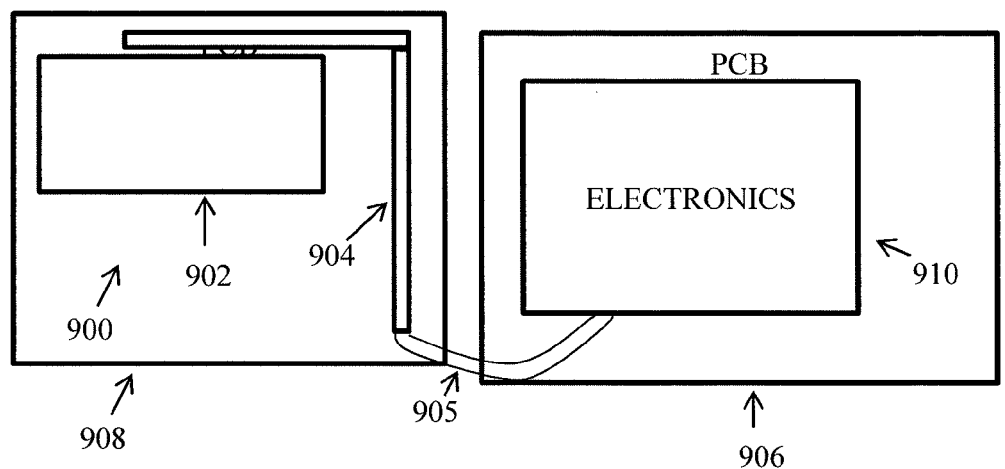
FIG. 9A illustrates an electrotextile antenna according to one embodiment.

As another example, in FIG. 9A, an MTM electrotextile antenna 900 is illustrated according to one embodiment. A conductive cell patch 902 made from an electrotextile material may be placed proximate to a feed line 904 on a supporting structure 908 (which may be flexible). In this regard, the conductive parts of the antenna 900 are made from flexible and lossy electrotextile material. The feed line 904 is electrically attached to a printed circuit board using a wire 905. In this regard, the wire 905 may have a connector connecting a portion of the electrotextile MTM antenna to electrical components 910 (such as those presented above in FIG. 3) disposed on a printed circuit board 906. The antenna 900 may be connected to supporting structure 908 by an adhesive, solder, a fastener or some other means. The spatially separated conductive cell patches 902 and feed line 904 are arranged in a manner similar to cell patch 302 and feed line 304 of FIG. 5 discussed above. Additionally, the antenna 900 of FIG. 9 may further have a ground plane and feed pad similar to the arrangement of the ground plane and feed pad of FIG. 5 and in one embodiment, the feed pad and/or ground plane of FIG. 9 may be electrotextile materials as opposed to pure metal materials.

It should be understood that wire 905 may not be necessary and electrotextile antenna 900 may be soldered directly to the PCB 906. In either event, at least a portion of the antenna is attached to the printed circuit board via a connection (e.g., wire, direct soldering, etc.).

According to another embodiment (not illustrated), the electrotextile antenna 900 may not be physically connected to or supported by supporting structure 908. In this regard, the electrotextile antenna 900 may be structurally free of both the PCB and the supporting structure 908.

It should be noted that the supporting structure 908 may be a substrate, such as felt fabric. However, the substrate may be different from the printed circuit board, as the substrate may be physically separated from the printed circuit board and/or is composed of different materials. The substrate should not be limited to felt fabric and may be any other material which can physically support the electrotextile antenna. The substrate may, in one embodiment, have a relative permittivity less than 2, such as a permittivity of 1.22 or less.

Figure 9B:
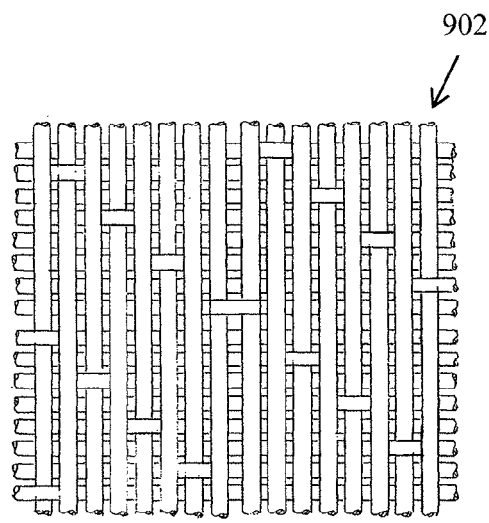
FIG. 9B illustrates an electrotextile pad of FIG. 9A according to one embodiment.

FIG. 9B illustrates the electrotextile conductive pad 902 of FIG. 9A according to one embodiment. The electrotextile conductive pad 902 may include a series of woven textile strands, wherein at least some of the strands contain a metallic element, such as strands coated or blended with a metal (e.g., copper, nickel, silver and/or other metal). It should be understood that the electrotextile antenna may be made up of a series of individual strands of electrotextile that are joined together to form a desired shape of radiating elements of the antenna.

Below is empirical data that shows three electrotextile antennas vs. conventional/non-electrotextile antennas in terms of design and performance. Each antenna is designed at 900 MHz frequency and is based off the MTM design of FIG. 9A. It should be noted that any other frequency may also be used, such as 450 MHz or 2.45 GHz. The below empirical data provides data on three different electrotextiles: (1) a first electrotextile material of pure copper polyester taffeta fabric (PCPTF): a thick plain woven polyester textile, coated using pure copper; (2) a second electrotextile material: a ripstop, woven polyester textile plated with copper and nickel; and (3) a third electrotextile material: a ripstop, conductive metalized nylon fabric that plated with nickel, copper and silver. The table below shows parameters of electrotextile antennas having such different conductive materials as well as conventional antennas having silver and copper radiating elements:

| Material | Surface Resistance Rs ($\Omega$) | Conductivity $\sigma$ (S/m) |
| --- | --- | --- |
| First Electrotextile Material PCPTF | 0.05 | $2.5 \times 10^5$ |
| Second Electrotextile Material | 1 | $1.96 \times 10^5$ |
| Third Electrotextile Material | 0.02 | $5.0 \times 10^5$ |
| Sliver (non-electrotextile material) | | $6.30 \times 10^7$ |
| Copper (non-electrotextile material) | | $5.96 \times 10^7$ |

The table below shows some design factors and gain of electrotextile antennas and conventional antenna:

| Conductive Material | Strip Thickness (mm) | Strip weight (g/m$^2$) | Substrate Materials Thickness (mm) | Substrate Relative Permittivity | Substrate Tangent Loss | Antenna Gain |
| --- | --- | --- | --- | --- | --- | --- |
| First Electrotextile Material (PCPTF) | 0.08 | 80 | 2.0 (felt fabric) | 1.22 | 0.016 | 3.258 |
| Second Electrotextile Material | 0.17 | 230 | 2.0 (felt fabric) | 1.22 | 0.016 | 3.273 |
| Third Electrotextile Material | 0.1 | 80 | 2.0 (felt fabric) | 1.22 | 0.016 | 3.281 |
| Conventional/Non-Electrotextile Material | 0.035 | | 1.6 (FR4) | 4.7 | >0.02 | 3.584 |

The strip thickness relates to how wide the conductive radiating strip is for each respective antenna. It should be noted that the thickness of the electrotextile materials are significantly greater than conventional antennas. This is because the conductivity of the conventional antenna is much greater than electrotextile antennas.

Additionally, the substrate used in the electrotextile antennas may be felt fabric which has a substrate permittivity of 1.22 which is much less than the 4.7 substrate permittivity of FR4 substrate of a conventional antenna. Because electrotextile antennas are not required to be attached to a PCB, such as an FR4 substrate, the electrotextile antennas may be attached to a substrate which substantially has a permittivity similar to air. Thus, since felt fabric has a permittivity of 1.22, which is substantially similar to the 1.0 permittivity of air, the electrotextile antennas act as if there is substantially no substrate. This is ideal since any added permittivity will increase the losses of the antenna. This is evidenced in the above table since the substrate tangent losses of conventional antennas are greater than 0.02 which the substrate tangent loss of felt fabric is 0.016. Thus, the radiation for conventional antennas is greater than that of conventional antennas.

Additionally, it should be noted that the antenna gain for the conventional antenna is similar to the antenna gain for the electrotextile antennas. As such, there is substantially no significant reduction in the amount of antenna gain in the electrotextile antenna versus a conventional antenna in the configuration of FIG. 9A. The same applies to the other antennas of FIGS. 4-8 and any other MTM antenna.

Figure 10:
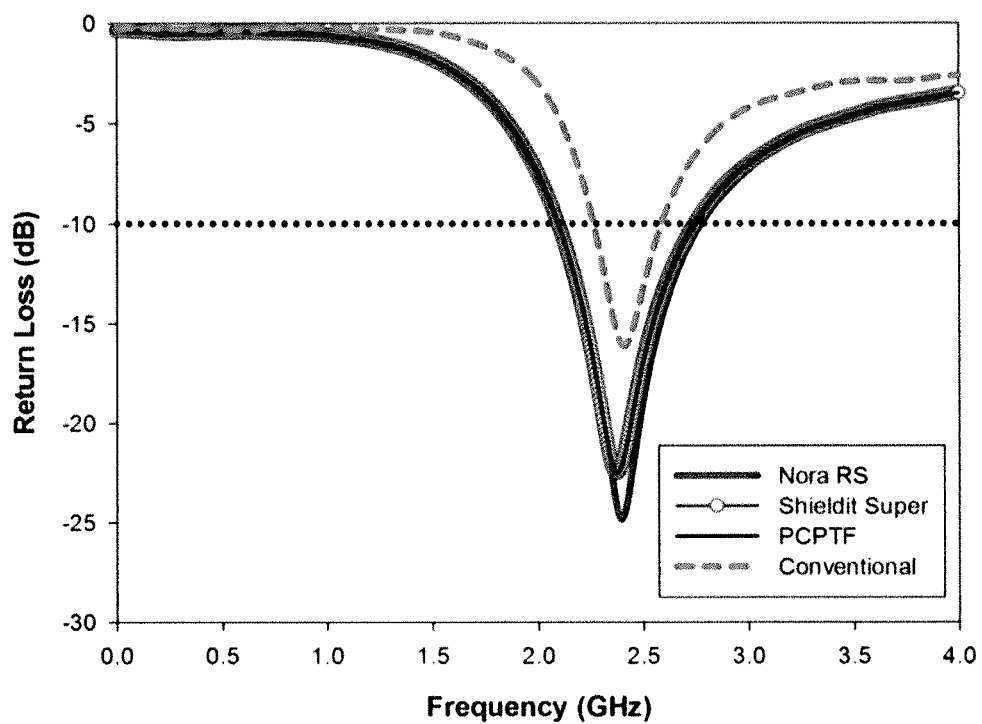
FIG. 10 illustrates a graph illustrating bandwidth of electrotextile antennas according to some embodiments.

FIG. 10 illustrates a graph illustrating bandwidth of the electrotextile antennas versus the conventional antenna discussed above. As illustrated, all three electrotextile antennas exhibited better performance in terms of reflection coefficient compared to the conventional antenna. As shown, the bandwidth of the conventional antenna (i.e., at 10 dB down) was approximately 0.3 GHz (2.3-2.6 GHz) as opposed to the bandwidth of the electrotextile antennas which was approximately 0.7 GHz (2.1-2.8 GHz). As such, the bandwidth was more than double for the electrotextile antennas as compared with the conventional antenna.

Therefore the electrotextile MTM antenna, as described herein, has a better bandwidth while also having a similar antenna gain. The electrotextile antenna affects the resonance frequency to make the bandwidth broader by reducing the reflections.

It should be understood that all antennas referenced above with regard to the tables and FIG. 10 were designed at 2.45 GHz. However, the electrotextile antennas may also be designed at any other frequency, such as between 450 MHz-1.25 GHz. In one embodiment, the electrotextile antennas may be designed at 900 MHz.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. An apparatus comprising:
a substrate;
an electrotextile antenna attached to the substrate, wherein the electrotextile antenna communicates with radio frequency identification (RFID) transponders, the electrotextile antenna comprising a conductive, metalized fabric including at least three different metals and that has a conductivity of between $1.0\times10^5$ Siemens/meter and $5.0\times10^5$ Siemens/meter, wherein the electrotextile antenna comprises conductive elements, wherein the conductive elements comprise:
two or more spatially separated conductive cell patches capactively coupled together;
a feed pad; and
one or more conductive feed lines comprising a strip connected to the feed pad, and
wherein the one or more conductive feed lines are electrically coupled with the one or more conductive cell patches, creating a radiative pattern that reads RFID transponders in a corresponding interrogation zone.

2. The apparatus of claim 1, wherein the electrotextile antenna comprises a woven polyester textile coated using pure copper.

3. The apparatus of claim 1, wherein the electrotextile antenna comprises a ripstop, woven polyester textile plated with copper and nickel.

4. The apparatus of claim 1, wherein the electrotextile antenna comprises a ripstop, conductive metalized nylon fabric that plated with nickel, copper and silver.

5. The apparatus of claim 1, wherein the substrate is flexible to allow for the electrotextile antenna to be deformed.

6. The apparatus of claim 1, wherein the substrate has a relative permittivity of less than 2.

7. The apparatus of claim 1, wherein the substrate is separate from a printed circuit board.

8. The apparatus of claim 7, wherein a connection from the electrotextile antenna and the printed circuit board comprises a wire comprising a first end and a second end, wherein the first end is electrically connected to an end of the electrotextile antenna and the second end is electrically connected to a portion of the printed circuit board so that the electrotextile antenna can receive electrical signals from electronic components on the printed circuit board.

9. The apparatus of claim 1, wherein the electrotextile antenna has a thickness of at least 0.08 millimeters.

10. The apparatus of claim 1, wherein the electrotextile antenna is configured to transmit and receive signals at 900 MHz.

11. A system for reading transponders, the system comprising:
an RFID reading circuit; and
a metamaterial electrotextile antenna comprising conductive elements on a substrate, wherein the electrotextile antenna comprises a conductive, metalized fabric that comprises at least three metals and has a conductivity of between $1.0\times10^5$ Siemens/meter and $5.0\times10^5$ Siemens/meter, wherein the electrotextile antenna comprises conductive elements and communicates with the RFID reading circuit and RFID tags, wherein the electrotextile antenna is electrically connected to the RFID reading circuit to read RFID transponders in a corresponding interrogation zone, wherein the conductive elements comprise
two or more spatially separated conductive cell patches capactively coupled together;
a feed pad; and
one or more conductive feed lines comprising a strip connected to the feed pad; and
wherein the one or more conductive feed lines are electrically coupled with the one or more conductive cell patches, creating a radiative pattern that reads the RFID transponders in a corresponding interrogation zone.

12. The system of claim 11, wherein the electrotextile antenna comprises a woven polyester textile coated using pure copper.

13. The system of claim 11, wherein the electrotextile antenna comprises a woven polyester textile plated with copper and nickel.

14. The system of claim 11, wherein the electrotextile antenna comprises a conductive metalized nylon fabric plated with nickel, copper and silver.

15. The system of claim 11, wherein the electrotextile antenna is electrically connected to a printed circuit board via a connection comprising a wire or direct soldering without being physically connected to a substrate.

16. The system of claim 11, wherein the one or more conductive feed lines are spatially separated from the one or more conductive cell patches.

17. A method of manufacture of an electrotextile RFID antenna comprising:
   blending or coating portions of a flexible textile material with at least three metals, resulting in electrotextile material having a conductivity of between $1.0 \times 10^5$ Siemens/meter and $5.0 \times 10^5$ Siemens/meter;
   forming an electrotextile antenna on a substrate with the electrotextile material, the antenna structure configured to communicate with RFID transponders, thereby forming an electrotextile antenna comprising two or more conductive cell patches capacitively coupled together and one or more conductive feed lines;
   electrically coupling the one or more conductive feed lines with the one or more conductive cell patches creating a radiative pattern on the antenna from the coupling that reads RHD transponders in a corresponding interrogation zone; and
   electrically connecting a portion of the electrotextile antenna to an RFID circuit so that the electrotextile antenna transmits interrogation signals generated by the RFID circuit to the RFID transponders and receives response signals from the RFID transponders when reading RFID transponders in a corresponding interrogation zone.

18. The method of claim 17, further comprising attaching the electrotextile antenna to a substrate separate from a printed circuit board.

19. The method of claim 17, further comprising maintaining the electrotextile antenna as a freestanding antenna so that the electrotextile antenna is not attached a substrate.

* * * * *